United States Patent
Sunderland et al.

(10) Patent No.: US 8,395,524 B2
(45) Date of Patent: Mar. 12, 2013

(54) DATA COMMUNICATION FOR REFRIGERATED MERCHANDISERS

(75) Inventors: Ted Wayne Sunderland, Troy, MO (US); Dennis L. Wagner, Manchester, MO (US)

(73) Assignee: Hussmann Corporation, Bridgeton, MO (US)

( * ) Notice: Subject to any disclaimer, the term of this patent is extended or adjusted under 35 U.S.C. 154(b) by 791 days.

(21) Appl. No.: 12/616,619

(22) Filed: Nov. 11, 2009

(65) Prior Publication Data

US 2010/0117848 A1   May 13, 2010

Related U.S. Application Data

(60) Provisional application No. 61/113,275, filed on Nov. 11, 2008.

(51) Int. Cl.
G08B 21/00 (2006.01)

(52) U.S. Cl. .............. 340/686.6; 340/539.1; 340/541; 340/545.3; 340/555; 340/679

(58) Field of Classification Search .......... 340/686.6, 340/539.1, 541, 545.3, 555, 679
See application file for complete search history.

(56) References Cited

U.S. PATENT DOCUMENTS

| | | | |
|---|---|---|---|
| 5,838,116 A | 11/1998 | Katyl et al. | |
| 6,462,644 B1 | 10/2002 | Howell et al. | |
| 6,675,067 B2 | 1/2004 | Blad | |
| 6,794,831 B2 | 9/2004 | Leeb et al. | |
| 6,959,230 B1 | 10/2005 | Leibu et al. | |
| 7,309,965 B2 | 12/2007 | Dowling et al. | |
| 7,352,972 B2 | 4/2008 | Franklin | |
| 2004/0142685 A1 | 7/2004 | Glasser et al. | |
| 2006/0106490 A1 | 5/2006 | Howell et al. | |
| 2006/0119489 A1 | 6/2006 | Shinada et al. | |
| 2006/0275040 A1 | 12/2006 | Franklin | |
| 2007/0157258 A1 | 7/2007 | Jung et al. | |
| 2011/0005258 A1* | 1/2011 | Audet | 62/264 |
| 2011/0074596 A1* | 3/2011 | Frohlick et al. | 340/691.1 |

FOREIGN PATENT DOCUMENTS

| | | |
|---|---|---|
| EP | 1367549 | 12/2003 |
| JP | 6195553 | 7/1994 |
| JP | 8055625 | 2/1996 |
| JP | 2000207619 | 7/2000 |
| JP | 2003223669 | 8/2003 |
| JP | 2007004467 | 1/2007 |
| WO | 2004102504 | 11/2004 |

* cited by examiner

Primary Examiner — Daryl Pope
(74) Attorney, Agent, or Firm — Michael Best & Friedrich LLP

(57) ABSTRACT

A merchandiser communication system including a first plurality of merchandisers arranged in a first row and a second plurality of merchandisers arranged in a second row. Each of the merchandisers includes a light assembly coupled to a case to illuminate a product display area, a light sensor coupled to the case to detect light pulses, and a microcontroller. The light sensor is in visual proximity with one or more of the adjacent merchandisers located across the aisle. The microcontroller is in electrical communication with the light assembly and the light sensor to operate the light assembly to encode the signal in light pulses of the light assembly that are not detectable by a human eye. The communication system also includes a visible light-based communication network in communication with the merchandisers and is operable to communicate the encoded light pulses among the merchandisers via the light assemblies and the light sensors.

23 Claims, 4 Drawing Sheets

DATA COMMUNICATION FOR REFRIGERATED MERCHANDISERS

RELATED APPLICATIONS

This patent application claims priority to U.S. patent application Ser. No. 61/113,275 filed Nov. 11, 2008, the entire contents of which are hereby incorporated by reference.

BACKGROUND

The present invention relates to refrigerated merchandisers that include light sources, and more particularly, the present invention relates to a communication network for refrigerated merchandisers that include light sources.

In conventional practice, commercial businesses such as supermarkets and convenience stores are equipped with refrigerated merchandisers. Generally, these refrigerated merchandisers include light fixtures that illuminate a product display area and that can be turned "on" or "off." The lights are turned off to conserve energy when there is no consumer traffic. In some merchandisers, light output from the light fixtures of each merchandiser is separately varied between a simple "on" state (i.e., 100 percent output) and an "off" state (i.e., 0 percent output) using motion sensors that detect the presence of a consumer or other person in the vicinity of the associated merchandiser.

SUMMARY

The invention provides a communication system for a plurality of refrigerated merchandisers that includes a visible light-based communication network that has a sensor apparatus in the vicinity of the merchandisers. The communication network communicates data between merchandisers via light assemblies (transmitters) of the merchandisers and sensor apparatus (receivers) using encoded light pulses that are not detectable by the human eye.

In one construction, the invention provides a merchandiser communication system including a first plurality of merchandisers arranged in a first row and a second plurality of merchandisers arranged in a second row such that an area between the first plurality of merchandisers and the second plurality of merchandisers defines an aisle. Each of the first plurality of merchandisers and the second plurality of merchandisers includes a case defining a product display area, a light assembly coupled to the case to illuminate the product display area, a light sensor coupled to the case to detect light pulses and to generate a signal indicative of the light pulses, and a microcontroller. The light sensor is positioned in visual proximity with one or more of the adjacent merchandisers located across the aisle from the associated merchandiser. The microcontroller is in electrical communication with the light assembly and the light sensor of the corresponding merchandiser to operate the light assembly to encode the signal in light pulses of the light assembly. The encoded light pulses not detectable by a human eye. The communication system also includes a visible light-based communication network in communication with the first plurality of merchandisers and the second plurality of merchandisers. The communication network is at least partially defined by the light assembly, the light sensor, and the microcontroller of each merchandiser of the first and second pluralities of merchandisers, and the communication network is operable to communicate the encoded light pulses among the first and second pluralities of merchandisers via the light assemblies and the light sensors.

In another construction, the invention provides a method of communicating data among a plurality of merchandisers in a retail setting. The method includes providing a first plurality of merchandisers arranged in a first row and a second plurality of merchandisers arranged second row such that an area between the first and second rows defines an aisle. Each of the merchandisers defines a product display area and includes a light assembly partially defining a light-based communication network. The method also includes detecting light pulses emitted from one or more merchandisers of the first and second pluralities of merchandisers, generating a signal indicative of the light pulses, operating the light assembly to encode the signal in light pulses of the light assembly of a first merchandiser of the first and second pluralities of merchandisers, and communicating the encoded signal among the first and second pluralities of merchandisers via the light-based communication network.

In yet another construction, the invention provides a merchandiser including a case defining a product display area, a light assembly coupled to the case, a light sensor, and a microcontroller. The light sensor is configured to detect light pulses and to generate a signal indicative of the light pulses, and the light sensor is oriented to be in visual proximity with one or more adjacent merchandisers when arranged in an aisle of a store. The microcontroller is in electrical communication with the light assembly and the light sensor, and the microcontroller is programmed to operate the light assembly to encode the signal in light pulses of the light assembly. The encoded light pulses not detectable by a human eye. The light the light assembly, the light sensor, and the microcontroller at least partially define a visible light-based communication network adapted to be in communication with the one or more adjacent merchandisers when the merchandiser is arranged in the aisle of the store.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items.

Figure 1:
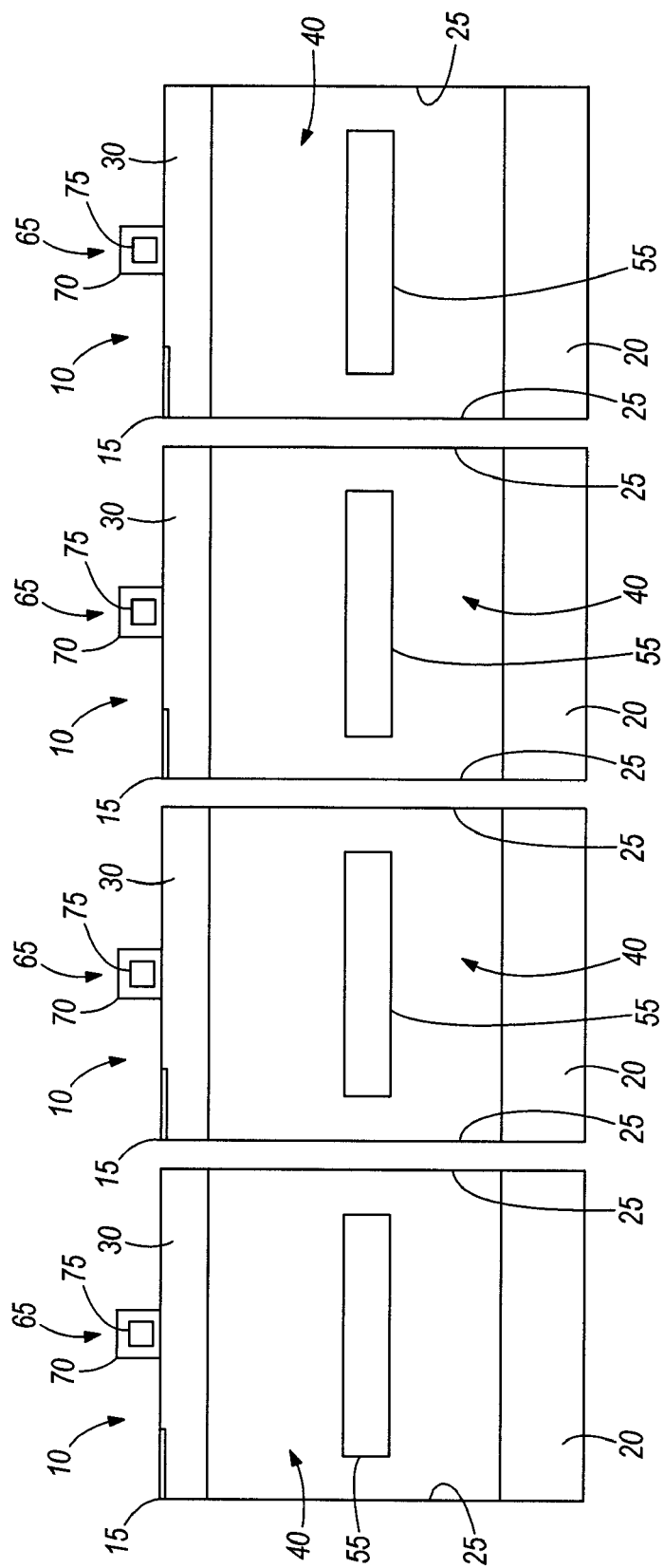
FIG. 1 is a front schematic view of a row of merchandisers and a communication network embodying the present invention.
Figure 2:
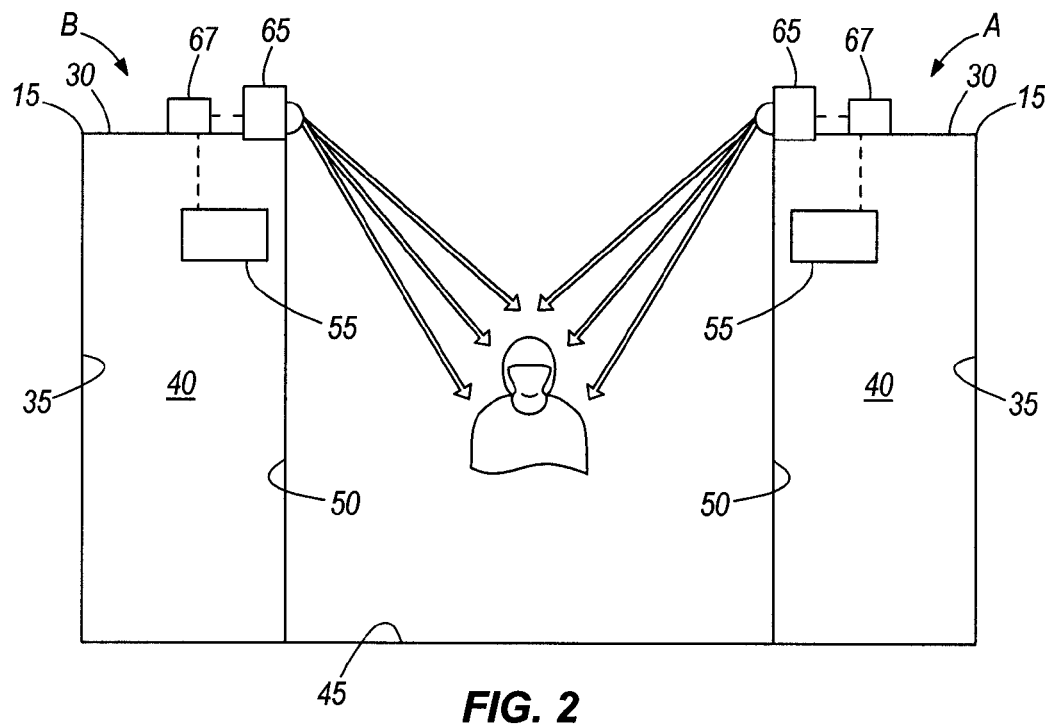
FIG. 2 is a schematic view of two rows of merchandisers including the communication network having sensor apparatus.
Figure 3:
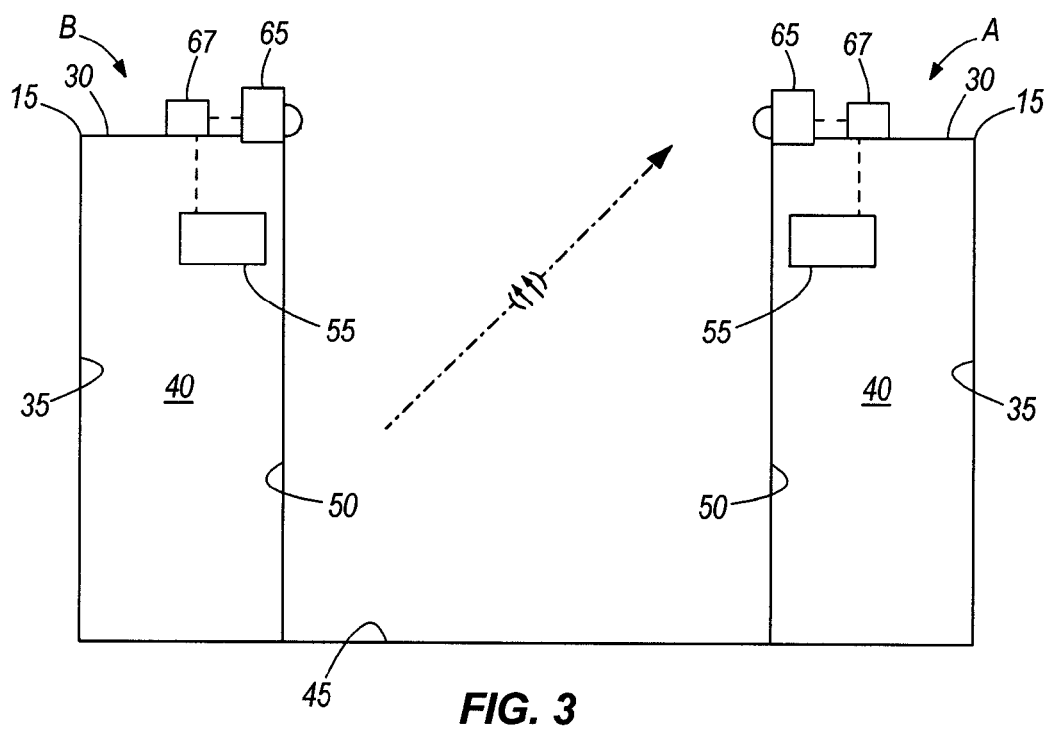
FIG. 3 is another schematic view of the two rows of merchandisers of FIG. 2.

FIG. 1 shows a plurality of merchandisers 10 that are arranged in a row, and that display food product (e.g., frozen food, fresh food, beverages, etc.) available to consumers in a retail setting (e.g., a supermarket or grocery store). Each merchandiser 10 includes a case 15 that has a base 20, side walls 25, a case top or canopy 30, and a rear wall 35 (FIGS. 2 and 3). At least a portion of a refrigeration system (not shown) can be located within the case 15 to refrigerate the food product. In other constructions, a heating system can be located within the case 15 to heat the food product. The area partially enclosed by the base 20, the side walls 25, the canopy 30, and the rear wall 35 defines a product display area 40. The food product is generally supported on shelves (not shown) within the product display area 40.

Figure 5:
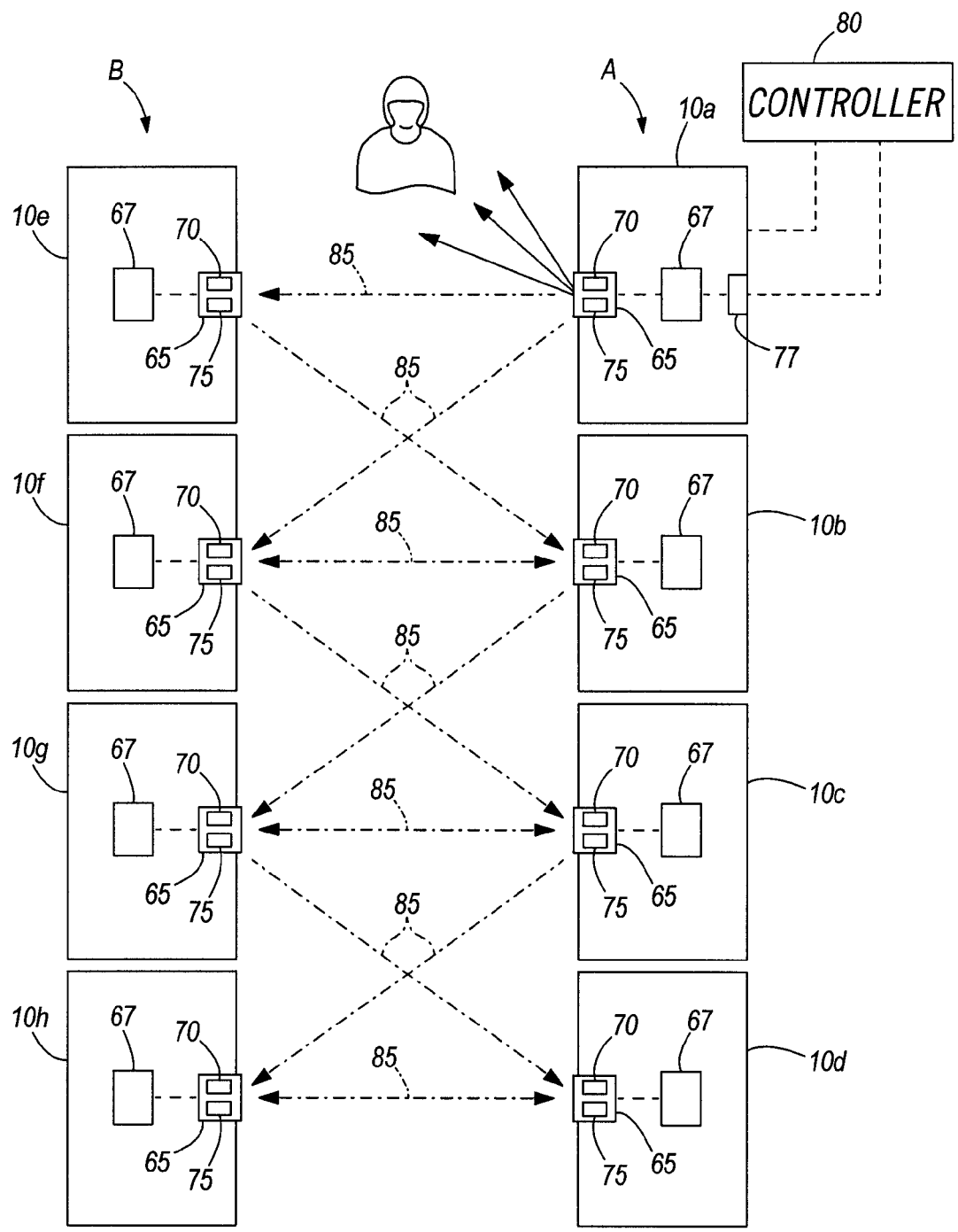
FIG. 5 is another schematic view of the two rows of merchandisers and the communication network having sensor apparatus, a microcontroller, and a controller.

FIGS. 2, 3, and 5 show that the merchandisers 10 are generally arranged in rows A, B that are separated from each other by an aisle 45. The product display areas 40 are directed toward or face the aisle 45 so that a consumer or other individual can walk along the aisle 45 between the rows A, B of merchandisers 10 to view food product supported within each merchandiser 10. As illustrated in FIGS. 1 and 5, each row A, B includes four merchandisers 10. In other constructions, each row A, B can include fewer or more than four merchandisers 10. Although the illustrated construction shows two rows A, B, the invention should not be limited to two rows of merchandisers 10. One row or more than two rows of merchandisers 10 are also possible and considered herein.

Generally, each of the cases 15 defines an opening 50 (FIGS. 2 and 3) to allow access the food product stored in the product display area 40. In some constructions, doors that include one or more translucent members may be positioned over the openings 50 to allow viewing of the food product from outside the case 15. The translucent member can be formed from glass, or alternatively, from other materials that are substantially translucent (e.g., acrylic, etc.).

FIGS. 1-3 show that each of the merchandisers 10 also includes a light assembly 55 that is coupled to the case 15 to illuminate the product display area 40. Generally, the light assembly 55 can be attached to the canopy 30 and/or to the shelves within the product display area 40. In constructions of the merchandiser 10 that include a door positioned over the opening 50, the light assembly 55 can be attached to a mullion (not shown) that couples the door to the case 15. The light assembly 55 includes light emitting diode (LED) light sources, although other light sources are possible and considered herein.

As illustrated in FIGS. 1-3 and 5, each of the merchandisers 10 further includes a sensor apparatus 65 and a dimmer control or microcontroller 67. The sensor apparatus 65 is coupled to the canopy 30 on the exterior side of the case 15, and includes a proximity or motion sensor 70 and a light sensor 75. In other constructions, the sensor apparatus 65 can be coupled to the merchandiser 10 in other areas (e.g., the product display area 40, the side walls 25, etc.). In some constructions, the light sensor 75 is a part of and integral with the proximity sensor 70. In other constructions, the proximity sensor 70 and the light sensor 75 can be separate components.

The proximity sensor 70 is generally directed toward the aisle 45 to detect the presence of an approaching consumer or other individual, and to generate a signal that is indicative of the presence of the approaching consumer. In the illustrated construction, the proximity sensor 70 is a passive infrared sensor. However, other proximity sensors 70 are possible and considered herein.

The illustrated light sensor 75 is a photo diode sensor that includes photo diodes or cells that measure light intensity. Other light sensors are also possible and considered herein (e.g., Cadmium Sulfide sensor, phototransistor, etc.). Generally, the light sensor 75 has a resistance that is variable depending on the amount of light that strikes the photo diodes, and a frequency response that is capable of importing or receiving data via the light. In particular, the light sensor 75 is adapted to receive data from an exterior light source that is in visual proximity with the light sensor 75.

The light sensor 75 of each merchandiser 10 is generally positioned in visual proximity with one or more of the adjacent merchandisers 10 to communicate light signals that are indicative of case data to and from the LED light sources of the adjacent merchandisers 10. As illustrated in FIGS. 3 and 5, the light sensors 75 that are coupled to the merchandisers 10 positioned in row A are in direct visual proximity with the product display areas 40 of the merchandisers positioned in row B such that the light sensors 75 of the merchandisers 10 in row A are in communication with the light assemblies 55 of the merchandisers in row B. Similarly, the light sensors 75 that are coupled to the merchandisers 10 positioned in row B are in direct visual proximity with the product display areas 40 of the merchandisers 10 positioned in row A such that the light sensors 75 of the merchandisers 10 in row B are in communication with the light assemblies 55 of the merchandisers 10 in row A. In the illustrated construction, the light sensors 75 receive signals that are indicative of case data.

For example, FIG. 5 shows that the light sensor 75 of the second merchandiser 10b in row A is in visual proximity with the product display areas 40 of the merchandisers 10e, 10f, 10g in row B. The light sensor 75 of the second merchandiser 10f in row B is in visual proximity with the product display areas 40 of the merchandisers 10a, 10b, 10c in row A. Likewise, the respective light sensors 75 of the third merchandiser 10c in row A is in visual proximity with the product display areas 40 of the merchandisers 10f, 10g, 10h in row B, and the respective light sensors 75 of the third merchandiser 10g in row B is in visual proximity with the product display areas 40 of the merchandisers 10b, 10c, 10d in row A. In other words, the light sensor 75 of a particular merchandiser 10 of one row (e.g., the merchandiser 10g) is in visual proximity with the product display area 40 of the merchandiser 10 (e.g., the merchandiser 10c) that is directly across the aisle 45 from the particular merchandiser 10, and the light sensor 75 is further in visual proximity with the product display areas 40 of the merchandisers 10 (e.g., the merchandisers 10b, 10d) that are directly adjacent the merchandiser 10 that is directly across the aisle 45. Other orientations of the light sensors 75 relative to the product display areas 40 are also possible and considered herein.

Each of the merchandisers 10 also can include other merchandiser sensors (e.g., temperature sensors, humidity sensors, ambient light sensors, etc.) that monitor one or more conditions of the case 15 and that are in communication with the microcontroller 67 to generate and deliver signals that are indicative of the respective case conditions. For example, a merchandiser sensor (not shown) can be positioned in the product display area 40 to sense the temperature and/or humidity of the product display area 40. A merchandiser sensor (not shown) also can be coupled to the refrigeration system, in addition or in lieu of the product display sensor, to sense conditions of the refrigeration system and to generate an associated signal. Other merchandiser sensors that sense one or more case conditions of the merchandisers 10 are also possible and considered herein.

The case data that is communicated through the LED light sources can include the presence of a consumer adjacent one or more of the merchandisers 10, case status of one or more of the merchandisers 10, ambient light level surrounding the merchandisers 10, the case conditions sensed by other merchandiser sensors (e.g., temperatures and/or humidity levels of one or more of the product display areas 40) and other information related to the merchandisers 10 (e.g., refrigeration system status, etc.).

Each microcontroller 67 is in communication with the light assembly 55 and the sensor apparatus 65 of the associated merchandiser 10 to control illumination of the product display area 40. In particular, the microcontroller 67 is in communication with the sensor apparatus 65 to receive the signal from the proximity sensor 70 that is indicative of consumer presence near or adjacent the merchandiser 10 and to vary the light level of the light assembly 55 based on the signal from the proximity sensor 70. In some constructions, the microcontroller 67 is in wired communication with the sensor apparatus 65. In other constructions, the microcontroller 67 can be in wireless communication with the sensor apparatus 65. In still other constructions, communication between the microcontroller 67 and the sensor apparatus 65 can be a combination of wired and wireless connections. The microcontroller 67 can be integrally formed with or subsumed in the sensor apparatus 65, or the microcontroller 67 can be separate from the sensor apparatus 65.

The microcontroller 67 utilizes pulse-width modulation to control the light output of the LED light sources based on the signals from the proximity sensors 70. In particular, the microcontroller 67 regulates the LED light sources by selectively varying the light or illumination level (i.e., the amount of light) that is provided by each of the light assemblies 55. The microcontroller 67 smoothly varies the light output of the LED light sources between 0 percent output and 100 percent output, and any output between 0 percent and 100 percent (e.g., 10 percent, 20 percent, 50 percent, 95 percent, etc.). Use of the microcontroller 67 allows reduction of the LED light sources to a low light level (e.g., 10-30 percent) to conserve energy when few or no consumers are in the vicinity of the merchandiser 10, and without having to turn the LED light sources completely off.

The microcontroller 67 of each merchandiser 10 also is in communication with the merchandiser sensors to receive signals that are indicative of case conditions. The microcontroller 67 is further in communication with the sensor apparatus 65 to receive case data signals from the light sensor 75 and to communicate case data signals to other merchandisers 10 in rows A, B. Generally, the microcontroller 67 encodes light pulses or light frequency modulation into the LED light sources (e.g., pulse width modulation of the light emanating from the LED light sources) to communicate case data to the merchandisers 10 via the LED light sources. Communication of case data by the microcontroller 67 through the LED light sources occurs at a frequency that is above that of the human visual perception range to avoid a perceptible flicker of the LED light sources. The operating frequency of the LED light sources is controlled to facilitate transmission of the data without visible light flicker. In some constructions, a Manchester encoding scheme is used to encode the light pulses. In other constructions, other encoding schemes can be used.

Generally, the first merchandiser 10 of each row A, B is defined as a head merchandiser of the respective row. For example, FIG. 5 shows that the first merchandiser 10a in row A and the first merchandiser 10e in row B are the head merchandisers for rows A, B, respectively. In other constructions, the merchandisers 10d and 10h can be defined as the head merchandisers of rows A, B, respectively.

As illustrated in FIG. 5, the head merchandiser 10a in row A further includes a gateway device 77 that is in communication with the microcontroller 67 and a controller 80. The gateway device 77 can be positioned anywhere on or in the merchandiser 10a. In some constructions, the head merchandisers 10a, 10e of the rows A, B, respectively, can include gateway devices 77. In other constructions, the head merchandiser 10e may include the gateway device 77 without the head merchandiser 10a having a gateway device 77.

The controller 80 can be located remotely from the merchandisers 10, or alternatively, the controller 80 can be located adjacent the merchandisers 10. The controller 80 is in direct communication with the gateway device 77 of the merchandiser 10a to communicate case data to, and to receive case data from, one or more of the merchandisers 10. In constructions that include the gateway device 77 on more than one merchandiser 10, the controller 80 can be in direct communication with each of the merchandisers 10 that includes the gateway device 77. Generally, the controller 80 is in direct communication with at least one of the head merchandisers 10 that are positioned on the end of a row to transmit and receive case data and to control operation of each of the merchandisers 10 (e.g., product display area temperature, humidity, operation of the refrigeration systems, etc.).

The controller 80 is in direct wireless communication with the gateway device 77 to deliver instructions or requests for information to the merchandisers 10 and to receive signals from the merchandisers 10. In other constructions, the controller 80 may be in direct communication with the gateway device 77 via a wired connection or a wired-wireless combination. As illustrated in FIG. 5, the controller 80 is in communication with the microcontroller 67 of the head merchandiser 10a via the gateway device 77 such that case data, instructions, requests for information, and responses can be transmitted between the merchandisers 10 and the controller 80.

The sensor apparatus 65 and the microcontroller 67 of each merchandiser 10, the gateway device 77, and the controller 80 define a visible light-based communication network for the merchandisers 10 that provides control of illumination of the product display areas and that distributes or transfers information and case data between the merchandisers 10. In the illustrated construction, the communication network is a wireless light-based communication network that utilizes existing wiring of the merchandisers 10 without additional wiring between the merchandisers 10 and without additional wiring between the controller 80 and the head merchandiser 10a.

In operation, the sensor apparatus 65 and the microcontrollers 67 cooperate to control illumination of the product display areas 40 and to communicate case data and other information (e.g., instructions, requests for information, etc.) to and from the merchandisers 10, and further between the merchandisers 10. Generally, each of the light sensors 75 of the merchandisers 10 in one row (e.g., row A) receives the light-based encoded signal from the LED light sources of the merchandisers 10 of the other row (e.g., row B). Although the present invention is described and illustrated with regard to detecting the presence of a consumer in the aisle 45 and communicating the consumer presence to the remaining merchandisers 10 via the light-based communication network, it should be understood that communication of other case data and information between the merchandisers 10 using the light-based communication network occurs in the same manner. In addition, although the communication network is described and illustrated with regard to detecting one consumer in the aisle 45, the present invention is equally applicable to more than one consumer being present and detectable in the aisle 45. Furthermore, one or more of the merchandisers 10 can detect the presence of a consumer and/or initiate light-based communication with the remaining merchandisers 10 and with the controller 80.

The presence of a consumer in the vicinity of one or more of the merchandisers 10 is detected by the associated proximity sensors 70. With reference to FIGS. 2 and 5, a consumer approaches the aisle 45 adjacent one or both merchandisers 10a, 10e of the rows A, B, respectively. As illustrated in FIG. 5, the proximity sensor 70 of the head merchandiser 10a detects the presence of the consumer and transmits the signal that is indicative of the consumer presence to the microcontroller 67 of the merchandiser 10a. The microcontroller 67 adjusts the light level of the LED light sources in the head merchandiser 10a based on the signal that is indicative of consumer presence. For example, when the consumer is detected by the proximity sensor 70, the light level is increased to 100 percent illumination. The microcontroller 67 further modulates the consumer presence signal and encodes the signal into light from the LED light sources of the merchandiser 10a for communication of the encoded signal to the remaining merchandisers 10 in row A and row B via the light-based communication network.

As illustrated in FIG. 5, the encoded consumer presence signal 85 from the microcontroller 67 of the head merchandiser 10a is received by the light sensor 75 of the merchandisers 10 that are in visual proximity with the product display area 40 of the merchandiser 10a. FIG. 5 shows the encoded consumer presence signal 85 as a unidirectional signal between some of the merchandisers 10 (e.g., the merchandiser 10a and the merchandiser 10f). It should be understood that the encoded signal 85 is bidirectional such that each merchandiser 10 that is in visual proximity with the source or signal-originating merchandiser 10 receives or acquires the encoded signal 85. In other words, while the encoded signal 85 between the merchandiser 10a and the merchandiser 10f is shown in FIG. 5 as being unidirectional toward the merchandiser 10f, it should be understood that when the encoded signal 85 is transmitted by the merchandiser 10f, the light sensor 75 of the merchandiser 10a, in addition to the light sensors 75 of the merchandisers 10b, 10c, acquires or receives the encoded signal 85. FIG. 5 has been simplified to show communication of the encoded consumer presence signal 85 between the merchandisers 10, and should not be construed to limit the scope of the present invention.

In the illustrated construction, the encoded consumer presence signal 85 that is sent via the LED light sources of the merchandiser 10a is directly received or acquired by the light sensors 75 of the merchandisers 10e and 10f. Each of the microcontrollers 67 of the merchandisers 10e and 10f receives and decodes the encoded consumer presence signal 85 from the associated light sensor 75, and the associated microcontroller 67 adjusts the light level of the LED light sources based on the decoded signal. The microcontroller 67 of the associated merchandiser 10 (e.g., the merchandisers 10e, 10f) further modulates the consumer presence signal and encodes the signal into light from the LED light sources of the merchandiser 10a for communication of the encoded signal to the remaining merchandisers 10 in row A and row B via the light-based communication network.

With continued reference to FIG. 5, the encoded consumer presence signal 85 is delivered to or received by the light sensors 75 of the remaining merchandisers 10 in row A and row B similar to communication of the signal to the merchandisers 10e, 10f. The light levels of the associated product display areas 40 are thereby adjusted based on the consumer presence signal 85 that originated from the head merchandiser 10a. For example, the encoded signal 85 that is transmitted from the merchandiser 10f is detected or acquired by the light sensors 75 of the merchandisers 10a, 10b, 10c in row A. The light level of the product display areas 40 of the merchandisers 10b, 10c are adjusted by the associated microcontroller 67 in response to the encoded signal 85. As discussed in detail below, the encoded signal 85 that is received by the light sensor 75 of the merchandiser 10a is ignored or disregarded by the associated microcontroller 67. The light-based encoded signals 85 that are acquired and decoded by the microcontrollers 67 of the merchandisers 10b, 10c are further transmitted from the respective merchandisers 10b, 10c to the remaining merchandisers 10 via the LED light sources.

Communication of consumer presence via the light-based communication network allows adjustment of the light level in each of the merchandisers 10 with minimal delay so that all of the product display areas 40 are adequately illuminated for consumer viewing. In other words, the light-based communication network allows the light level of each product display area 40 to be adjusted substantially simultaneously with the product display area 40 of the merchandiser 10 that initially detected the presence of the consumer. The near simultaneous light level adjustment avoids the delay that is generally associated with independent or separate motion sensors that necessitate the presence of the consumer near or adjacent the associated merchandiser before the light level is adjusted.

Figure 4:
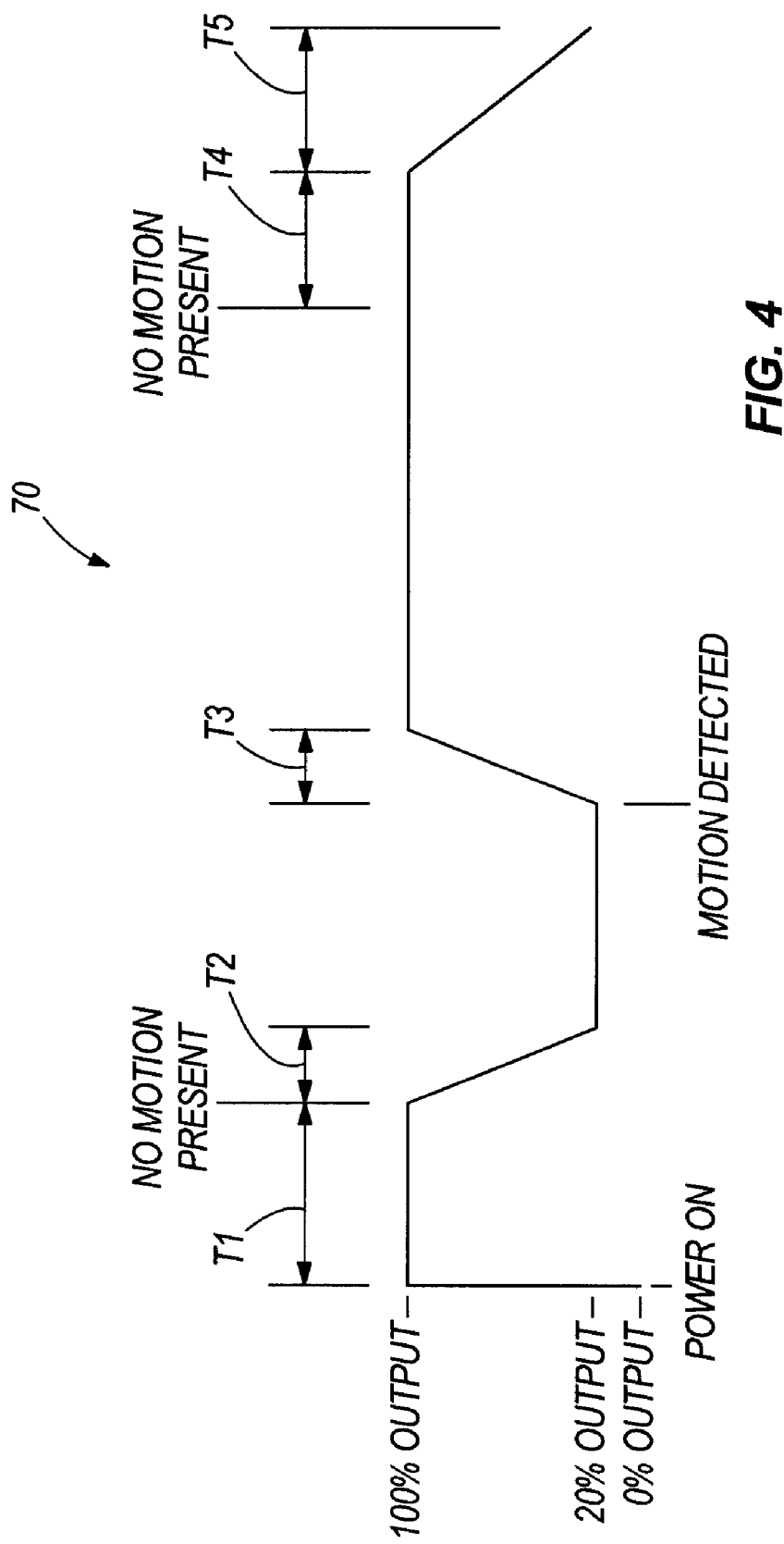
FIG. 4 is an operating diagram of a proximity sensor of the sensor apparatus of FIG. 2.

The light levels of the product display areas 40 are adjusted based on the detection of a consumer by the proximity sensors 70. As shown in FIG. 4, the microcontroller 67 varies the light level between about 20 percent output and 100 percent output based on the signal indicative of consumer presence from the proximity sensor 70 of the associated merchandiser 10. After a predetermined time T1 (e.g., 30 seconds, 2 minutes, etc.) in which the presence of a consumer or other individual has not been detected, the microcontroller 67 smoothly reduces the light level from 100 percent light output to 20 percent light output, until subsequent motion is detected by the proximity sensor 70 or other proximity sensors. One of ordinary skill in the art understands that other light outputs also are possible, and that the time during which the light sources are at a particular light output can vary based on desired lighting characteristics for the merchandisers 10.

After power is supplied to the sensor apparatus 65 of each merchandiser 10, the microcontroller 67 regulates the LED light sources at the 100 percent light output for the predetermined time T1 (e.g., 30 seconds). When the predetermined time T1 has elapsed without detection of an approaching consumer by any of the proximity sensors 70, the microcontroller 67 reduces the light level of the LED light sources to approximately 20 percent light output over a predetermined time T2 (e.g., 1 second, 2 seconds, 5 seconds, etc.). When a proximity sensor 70 of one merchandiser 10 detects the presence of an approaching consumer, the light level of the associated light sources is smoothly increased by the microcontroller 67 over a predetermined time T3 (e.g., 1 second, 2 seconds, 5 seconds, etc.) to the 100 percent light output to illuminate the product display area 40 and the associated encoded signal is transmitted to the remaining merchandisers 10. The predetermined time T3 can be the same as or different from the predetermined time T2. Similarly, when the proximity sensors 70 do not detect the presence of a consumer for a predetermined time T4, the light level of the light sources are reduced to a low light output (e.g., 20 percent light output)

based on predetermined operating parameters. The predetermined time T4 can be the same as or different from the predetermined time T1. The light level is reduced to a low light output over a predetermined time T5 that can be the same as or different from the predetermined time T2 and the predetermined time T3.

As discussed above, other case data and other information (e.g., requests for information from the controller 80, responses to requests, etc.) are communicated or transmitted between the merchandisers 10 in the form of encoded light signals via the light-based communication network. Case data and other information are further wirelessly communicated between the head merchandiser 10a and the controller 80 via the gateway device 77. Generally, the case data signals are modulated and encoded by the microcontroller 67 of the associated merchandiser 10, and the encoded light-based signals are communicated between the merchandisers 10 via the LED light sources until the signals reach the merchandiser of interest, or until the signals reach the head merchandiser 10a where the signals are transmitted to the controller 80.

For example, when the controller 80 requests information from one or more of the merchandisers 10 or when instructions are provided by the controller 80 to one or more of the merchandisers 10 (e.g., a request for the temperature in one or more of the product display areas, instructions to the refrigeration system, etc.), the controller 80 communicates the requests or the instructions to the gateway device 77. The gateway device 77 transmits the requests or the instructions to the microcontroller 67 of the head merchandiser 10a, which then modulates and encodes the requests/information into a light-based signal. The light-based encoded signal is transmitted to the remaining merchandisers 10 via the light-based communication network until the signal reaches the intended or desired end destination (e.g., the merchandiser of interest).

Similarly, the microcontroller 67 of a particular merchandiser 10 can communicate information to the controller 80 without a prior request for information or without prior instructions. As discussed above, the microcontroller 67 modulates and encodes the information to be transmitted to the controller 80. The encoded signal is delivered to the controller 80 by sending the signal from the LED light sources of the source merchandiser 10 (i.e., the merchandiser 10 from which the signal is generated) to the light sensors 75 of the merchandisers 10 that are in visual proximity with the source merchandiser 10 until the head merchandiser 10a is reached. The signal is decoded by the microcontroller 67 of the head merchandiser 10a, and is thereafter communicated to the controller 80 via the gateway device 77.

Generally, transmission of the encoded light-based signal through the light-based communication network defines a token passing scheme between the merchandisers 10. The encoded signal from the source merchandiser 10 is communicated to all merchandisers 10 that are in visual proximity with the source merchandiser 10 until the signal reaches the merchandiser of interest, or until the signal reaches the controller 80 via the head merchandiser 10a. In other words, the encoded signal is passed or communicated from merchandiser to merchandiser until the signal reaches the intended destination (e.g., merchandiser of interest, the controller 80).

The light-based communication network utilizes a collision detection scheme or random fall back timers to avoid having signals continuously communicated between the merchandisers 10, and to ensure that the encoded signals reach the intended destination. The signals are otherwise transmitted in a continuous loop between the merchandisers 10 due to the visual relationship of the merchandisers 10. The collision detection scheme allows communication of an encoded signal from the source merchandiser 10 to the merchandisers 10 that are in visual proximity with the source merchandiser 10 without the signal being acted upon by the source merchandiser 10. In other words, the collision detection scheme ensures that the encoded signal is transmitted away from or "downstream" of the source merchandiser 10.

Generally, after the source merchandiser 10 transmits the encoded light-based signal to the merchandisers 10 that are in visual proximity therewith, the collision detection scheme allows the source merchandiser 10 to 'ignore' the encoded signal that is returned or transmitted from the visually proximal merchandisers 10 for a predetermined or random period of time (e.g., three seconds, etc.). In some constructions, the period of time that the source merchandiser 10 ignores a return or bounce-back signal corresponds to the amount of time that is necessary for the encoded signal to be transmitted from the source merchandiser 10 to the merchandisers 10 in visual proximity, and for the encoded signal to be transmitted from the visually proximal merchandisers 10 to the remaining merchandisers 10 in the rows A, B that are downstream from the visually proximal merchandisers 10.

For example, when the merchandiser 10a communicates an encoded light-based signal to the merchandisers 10e, 10f, the merchandisers 10e, 10f decode the signal and further transmit the signal to the merchandisers 10a, 10b, 10c that are in visual proximity with the merchandisers 10e, 10f, respectively. In this example, the encoded signal is transmitted to the merchandisers 10b, 10c, and the encoded signal is transmitted back or returned to the merchandiser 10a in the form of a bounce-back signal. The bounce-back signal contains the same information or data that the signal transmitted from the originating merchandiser 10a contained. Without the collision detection scheme, the merchandiser 10a would decode and respond to the signal, and the merchandiser 10a would further re-transmit the same information via an encoded light-based signal to the merchandisers 10e, 10f in a continuous loop. Instead, the collision detection scheme of the source merchandiser 10 inhibits the merchandiser 10a from acting upon the bounce-back signal until after the encoded signal has been transmitted from the merchandisers 10e, 10f (i.e., after the merchandisers 10b, 10c acquire the encoded signal from the merchandisers 10e, 10f. Thus, the collision detection scheme avoids communication of a particular signal along a continuous loop between the merchandisers 10.

In some constructions, the source merchandiser 10 can incorporate a listening mode in which the source merchandiser 10 recognizes the encoded signal from the visually proximal merchandisers 10 to verify that the signal has been transmitted to the remaining merchandisers 10 without actively reacting to the encoded signal (i.e., decoding and interpreting the signal). In other constructions, the source merchandiser 10 can retransmit the encoded signal after a predetermined time period to ensure that the signal reaches the intended end destination.

The controller 80 monitors and controls the merchandisers 10 via the light-based communication network based on the case data and other information using the light-based, wireless token passing scheme. In this manner, the light-based communication network effectively communicates case data and other information between the merchandisers 10 and between the controller 80 and the merchandisers 10 without additional electrical wiring between the merchandisers 10.

Various features and advantages of the invention are set forth in the following claims.

The invention claimed is:

1. A merchandiser communication system comprising:
a first plurality of merchandisers arranged in a first row and a second plurality of merchandisers arranged in a second row such that an area between the first plurality of merchandisers and the second plurality of merchandisers defines an aisle, each of the first plurality of merchandisers and the second plurality of merchandisers including
a case defining a product display area,
a light assembly coupled to the case to illuminate the product display area,
a light sensor coupled to the case to detect light pulses and to generate a signal indicative of the light pulses, the light sensor positioned in visual proximity with one or more of the adjacent merchandisers located across the aisle from the associated merchandiser, and
a microcontroller in electrical communication with the light assembly and the light sensor of the corresponding merchandiser to operate the light assembly to encode the signal in light pulses of the light assembly, the encoded light pulses not detectable by a human eye; and
a visible light-based communication network in communication with the first plurality of merchandisers and the second plurality of merchandisers, the communication network at least partially defined by the light assembly, the light sensor, and the microcontroller of each merchandiser of the first and second pluralities of merchandisers, the communication network operable to communicate the encoded light pulses among the first and second pluralities of merchandisers via the light assemblies and the light sensors.

2. The merchandiser communication system of claim 1, wherein the communication network is operable to control illumination of the product display areas based on the light pulses.

3. The merchandiser communication system of claim 1, wherein each of the light assemblies includes LED light sources.

4. The merchandiser communication system of claim 1, wherein the light pulses are indicative of case data including at least one of a presence of an individual adjacent one or more merchandisers of the first and second pluralities of merchandisers, a case status of one or more of the merchandisers, and a case condition of one or more of the merchandisers.

5. The merchandiser communication system of claim 4, further comprising a merchandiser sensor in communication with the microcontroller to generate and deliver at least one signal indicative of the case condition to the microcontroller, and wherein the merchandiser sensor includes at least one of a temperature sensor, a humidity sensor, an ambient light sensor adapted to detect ambient light level surrounding one or more of the merchandisers.

6. The merchandiser communication system of claim 1, further comprising a proximity sensor directed toward the aisle to detect the presence of an approaching individual and to generate a signal indicative of the presence of the approaching individual.

7. A method of communicating data among a plurality of merchandisers in a retail setting, the method comprising:
providing a first plurality of merchandisers arranged in a first row and a second plurality of merchandisers arranged second row such that an area between the first and second rows defines an aisle, each of the merchandisers defining a product display area and including a light assembly partially defining a light-based communication network;
detecting light pulses emitted from one or more merchandisers of the first and second pluralities of merchandisers;
generating a signal indicative of the light pulses;
operating the light assembly to encode the signal in light pulses of the light assembly of a first merchandiser of the first and second pluralities of merchandisers; and
communicating the encoded signal among the first and second pluralities of merchandisers via the light-based communication network.

8. The method of claim 7, further comprising communicating the encoded signal from the first merchandiser to a second merchandiser of the second plurality of merchandisers via the light assembly of the first merchandiser; and
communicating the encoded signal from the second merchandiser to a third merchandiser of the first plurality of merchandisers via the light assembly of the second merchandiser.

9. The method of claim 8, further comprising delaying communication of the encoded signal from the second merchandiser to the first merchandiser for a period of time.

10. The method of claim 7, further comprising
illuminating the product display areas with the respective light assemblies; and
controlling the light output of the light assemblies of each merchandiser of the first and second pluralities of merchandisers based on the encoded signal.

11. The method of claim 7, wherein detecting light pulses includes acquiring case data including at least one of a presence of an approaching individual adjacent one or more of the first and second pluralities of merchandisers, a case status of one or more of the first and second pluralities of merchandisers, and a case condition of one or more of the first and second pluralities of merchandisers.

12. The method of claim 11, wherein the acquired case data is indicative of the presence of an approaching individual, the method further comprising
substantially simultaneously controlling the light level of each product display area based on the encoded signal.

13. The method of claim 12, wherein substantially simultaneously controlling the light level includes varying the light level of each of the light assemblies between a first light output and a second light output that is lower than the first light output.

14. The method of claim 13, further comprising regulating the light level at the first light output for a first predetermined time in response to the encoded signal.

15. The method of claim 14, further comprising
detecting the absence of an individual adjacent the first and second pluralities of merchandisers after the first predetermined time;
generating a case data signal indicative of the absence;
encoding the case data signal indicative of the absence in light pulses of the light assembly;
communicating the encoded light pulses to the remaining merchandisers via the light-based communication network;
substantially simultaneously reducing the light level from the first light output to the second light output in response to the light pulses; and
regulating the light level at the second light output for a second predetermined time.

16. The method of claim 15, further comprising
subsequently detecting the presence of an approaching individual adjacent one or more of the first and second pluralities of merchandisers using the corresponding light sensor;
generating a case data signal indicative of the presence;
encoding the case data signal indicative of the presence in light pulses of the light assembly;
communicating the encoded light pulses to the remaining merchandisers; and
substantially simultaneously increasing the light level from the second light output to the first light output.

17. A merchandiser comprising:
a case defining a product display area;
a light assembly coupled to the case;
a light sensor coupled to the case and configured to detect light pulses and to generate a signal indicative of the light pulses, the light sensor oriented to be in visual proximity with one or more adjacent merchandisers when arranged in an aisle of a store;
a microcontroller in electrical communication with the light assembly and the light sensor, the microcontroller programmed to operate the light assembly to encode the signal in light pulses of the light assembly, the encoded light pulses not detectable by a human eye; and
wherein the light assembly, the light sensor, and the microcontroller at least partially define a visible light-based communication network adapted to be in communication with the one or more adjacent merchandisers when the merchandiser is arranged in the aisle of the store.

18. The merchandiser of claim 17, wherein the light assembly is positioned to illuminate the product display area.

19. The merchandiser of claim 18, wherein the communication network is operable to control illumination of the product display area based on the light pulses.

20. The merchandiser of claim 17, wherein the light assembly includes LED light sources.

21. The merchandiser of claim 17, wherein the encoded light pulses are indicative of case data including at least one of a presence of an individual, a case status, and a case condition.

22. The merchandiser of claim 21, further comprising a merchandiser sensor in communication with the microcontroller to generate and deliver at least one merchandiser signal indicative of a case condition to the microcontroller, wherein the microcontroller programmed to operate the light assembly to encode the merchandiser signal in additional light pulses of the light assembly, the additional encoded light pulses not detectable by a human eye, and wherein the merchandiser sensor includes at least one of a temperature sensor, a humidity sensor, an ambient light sensor adapted to detect ambient light level surrounding the merchandiser.

23. The merchandiser of claim 17, further comprising a proximity sensor directed toward the aisle to detect the presence of an approaching individual and to generate a presence signal indicative of the presence of the approaching individual, and wherein the microcontroller is programmed to operate the light assembly to encode the presence signal in additional light pulses of the light assembly, the additional encoded light pulses not detectable by a human eye.

* * * * *